(12) United States Patent
Park et al.

(10) Patent No.: US 11,584,666 B2
(45) Date of Patent: Feb. 21, 2023

(54) APPARATUS FOR MANUFACTURING HYDROGEN-CONTAINING WATER

(71) Applicant: Welltech Korea Co., Ltd., Siheung-si (KR)

(72) Inventors: Seung Yeol Park, Gwangju-si (KR); Nam Suck Lee, Gwangju-si (KR); Pil Jong Kim, Seoul (KR)

(73) Assignee: Welltech Korea Co., Ltd., Siheung-si (KR)

( * ) Notice: Subject to any disclaimer, the term of this patent is extended or adjusted under 35 U.S.C. 154(b) by 848 days.

(21) Appl. No.: 16/302,558

(22) PCT Filed: May 16, 2017

(86) PCT No.: PCT/KR2017/005051
§ 371 (c)(1),
(2) Date: Oct. 29, 2019

(87) PCT Pub. No.: WO2017/200260
PCT Pub. Date: Nov. 23, 2017

(65) Prior Publication Data
US 2020/0317541 A1    Oct. 8, 2020

(30) Foreign Application Priority Data
May 16, 2016 (KR) ................. 10-2016-0059783

(51) Int. Cl.
| C02F 1/461 | (2006.01) |
| B01D 46/00 | (2022.01) |
| C02F 1/467 | (2006.01) |

(52) U.S. Cl.
CPC ........ *C02F 1/4618* (2013.01); *B01D 46/0005* (2013.01); *C02F 1/4676* (2013.01);
(Continued)

(58) Field of Classification Search
CPC .... B01D 46/00; B01D 46/0005; B01D 46/42; B01D 46/0004; B01D 46/4272;
(Continued)

(56) References Cited

U.S. PATENT DOCUMENTS

| 2012/0070540 A1 | 3/2012 | Igarashi |
| 2013/0043124 A1* | 2/2013 | Park ................... A23L 2/52 |
| | | 204/263 |
| 2015/0239760 A1 | 8/2015 | Kim et al. |

FOREIGN PATENT DOCUMENTS

| CN | 105174384 A | 12/2015 |
| EP | 2567942 A2 | 3/2013 |
| EP | 2889561 A1 | 7/2015 |
| JP | 2010-269246 A | 12/2010 |
| JP | 5872116 B2 | 12/2015 |
| JP | 2016-000376 A | 1/2016 |

(Continued)

OTHER PUBLICATIONS

Extended European Search Report dated Nov. 18, 2019 in European Application No. 17799617.0, in 10 pages.
Ursúa et al., "Hydrogen Production From Water Electrolysis: Current Status and Future Trends," *Proceedings of the IEEE*, IEEE, New York, US, vol. 100, No. 2, Feb. 1, 2012, pp. 410-426.

(Continued)

*Primary Examiner* — Magali P Slawski
*Assistant Examiner* — Brad Gordon
(74) *Attorney, Agent, or Firm* — Knobbe, Martens, Olson & Bear, LLP

(57) ABSTRACT

An apparatus for manufacturing hydrogen-containing water is disclosed. In one aspect, the apparatus includes a container part formed with a upper space and a lower space positioned vertically from each other around a connecting passage therein. The apparatus also includes an ion exchange membrane configured to close the connecting passage and an electrolytic part comprising a cathode disposed on the upper space and a cathode an anode disposed on the lower space. The apparatus further includes a handle part configured to couple to the container part and to provide a supply passage for water to be supplied to the lower space and a discharge passage to discharge oxygen and ozone generated from the lower space.

12 Claims, 14 Drawing Sheets

(52) U.S. Cl.
CPC ............ *C02F 2001/4619* (2013.01); *C02F 2201/004* (2013.01); *C02F 2201/005* (2013.01); *C02F 2201/46115* (2013.01); *C02F 2201/46165* (2013.01); *C02F 2209/42* (2013.01); *C02F 2303/18* (2013.01); *C02F 2307/04* (2013.01)

(58) Field of Classification Search
CPC .. C02F 1/00; C02F 1/20; C02F 1/4618; C02F 1/4676; C02F 2001/4619; C02F 2201/004; C02F 2201/005; C02F 2201/46115; C02F 2201/46165; C02F 2209/42; C02F 2303/18; C02F 2307/04; C02F 9/005; C02F 1/008; C25B 1/04; C25B 1/13; C25B 9/23; Y02E 60/36
See application file for complete search history.

(56) References Cited

FOREIGN PATENT DOCUMENTS

| | | |
|---|---|---|
| KR | 10-2011-0009584 A | 1/2011 |
| KR | 20-2011-0010502 U | 11/2011 |
| KR | 10-2013-0024109 A | 3/2013 |
| KR | 10-2014-0046877 A | 4/2014 |
| KR | 10-1748789 81 | 6/2017 |

OTHER PUBLICATIONS

International Search Report and Written Opinion dated Aug. 22, 2017 in International Application No. PCT/KR2017/005051.

* cited by examiner

FIG. 6
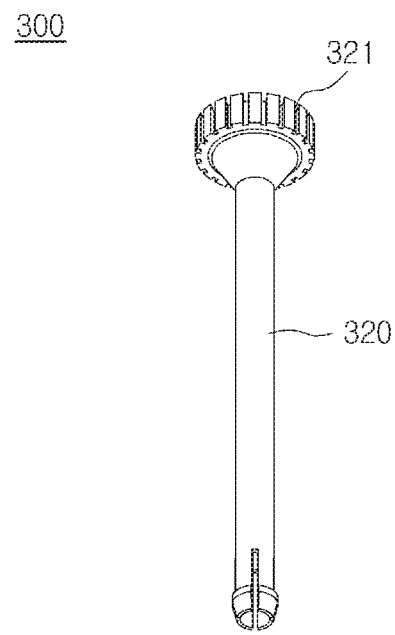
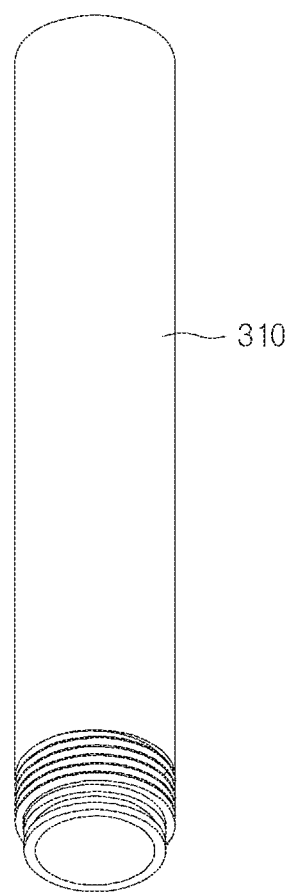

FIG. 8
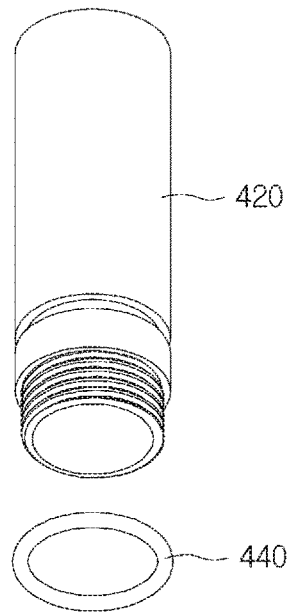
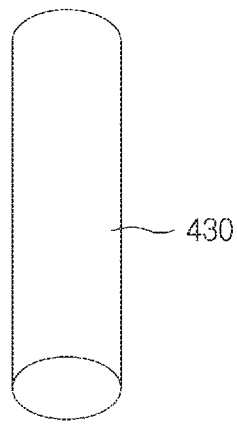
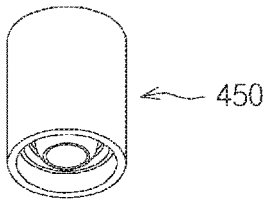
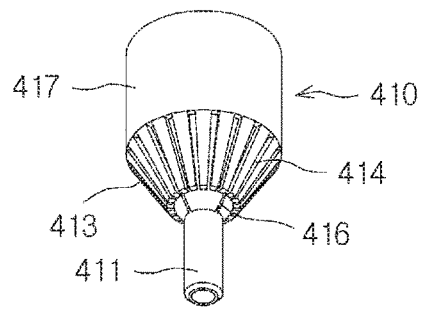

FIG. 9
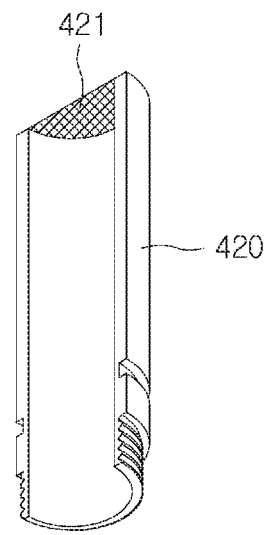
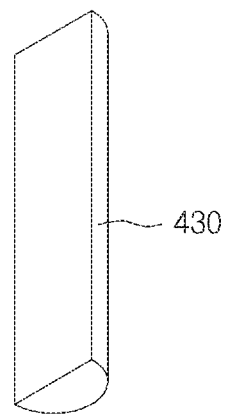
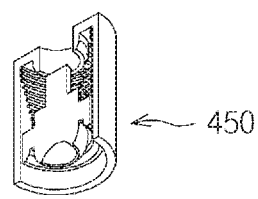
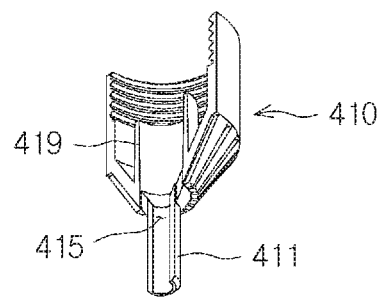

FIG. 11
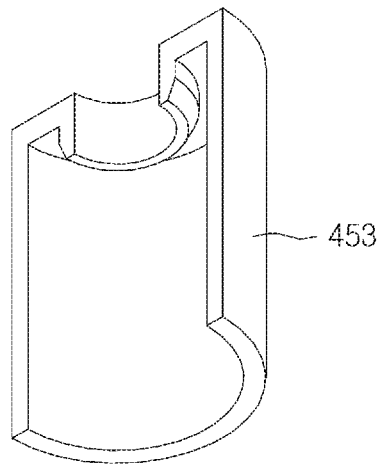
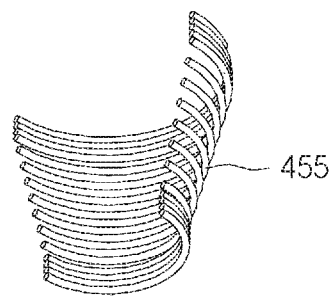
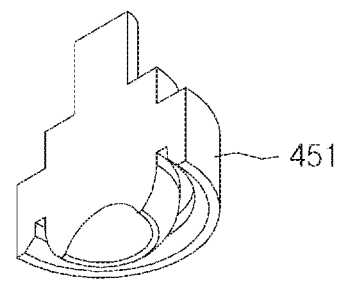

APPARATUS FOR MANUFACTURING HYDROGEN-CONTAINING WATER

CROSS REFERENCE TO RELATED APPLICATION(S)

The present application is a U.S. national phase application under 35 U.S.C. § 371 of International Application No. PCT/KR2017/005051, filed on May 16, 2017 and published as WO 2017/200260 A1 on Nov. 23, 2017, which claims the benefit of Korean Patent Application No. 10-2016-0059783 filed on May 16, 2016 in the Korean Intellectual Property Office, the entire disclosure of each of which is incorporated herein by for all purposes.

BACKGROUND

Field

This disclosure relates to an apparatus for manufacturing hydrogen-containing water.

Description of Related Art

It is known that a person's physical condition can be closely related to the water that a person drinks.

The body controls the intracellular osmotic action through balancing the metal ions. To this end, various minerals such as calcium, potassium, magnesium and the like necessary for the human body are supplied by drinking water.

Since the human body is mostly made of acid, it is preferable to drink alkalescence water to neutralize it. In addition to neutralization, the alkalescence water is known to inhibit cancer, to help activities of antioxidants and enzymes in the body, to improve digestion and absorption of food, and to strengthen immunity.

Hydrogen-containing water not only exhibits the above-mentioned effects, and but also provides radiation decontamination efficacy which was found when radioactive pollution became a serious global disaster due to releases of radioactivity at the time of the Fukushima nuclear power plant accident in 2011. Thus, there is a large demand for hydrogen-containing water in the international community.

The hydrogen-containing water may convert the active oxygen in the body into water to be absorbed into the body or be discharged out from the body. Specifically, since hydrogen can pass through the cell membrane, it binds to harmful active oxygen in the cell and then the active oxygen combined with hydrogen is converted into water. Therefore, the hydrogen-containing water is becoming more popular because it has excellent effects on various diseases such as cancer, diabetes, cerebral infarction and the like caused by excessive active oxygen in the body.

In JP Patent Publication No 2010-269246 (2010 Dec. 2), a method for producing hydrogen-containing water for beverages is disclosed.

SUMMARY

Embodiments of this disclosure can provide an apparatus for manufacturing hydrogen-containing water having a structure in which a water receptive space is separated upward and downward around a connecting passage provided with an ion exchange membrane.

According to one aspect, there is provided an apparatus for manufacturing hydrogen-containing water including a container part formed with a upper space and a lower space positioned vertically around a connecting passage therein; an ion exchange membrane configured to close the connecting passage; an electrolytic part comprising a cathode disposed on the upper space and an anode disposed on the lower space; and a handle part configured to couple to the container part and to provide a supply passage for water to be supplied to the lower space and a discharge passage to discharge oxygen and ozone generated from the lower space.

The apparatus may include a connecting part having a double pipe structure configured to connect the container part and the handle part.

The handle part may include a pipe member configured to couple to an outer pipe of the connecting part to extend upward; and a funnel member configured to couple to an inner pipe of the connecting part and having an upper outer circumferential surface in close contact with an inner circumferential surface of the pipe member, wherein a first gas discharge groove is formed on the upper outer circumferential surface of the funnel member to extend upward and downward to open both ends.

The handle part may further include a filter part configured to couple to the handle part and to filter the ozone discharged from the lower space.

The filter part may include a lower case configured to seat to the funnel member; an upper case configured to detachably couple to the lower case and cooperate with the lower case to form a receptive space; a mesh net configured to close an opened upper surface of the upper case; a filter member configured to be disposed in the receptive space to filter ozone; and a third sealing member configured to couple to an outer circumferential surface of the lower case or the upper case, wherein the lower case is formed such that the receptive space is connected to the inner space of the funnel member and the first gas discharge groove.

The lower case includes a tapered region configured to be in close contact with the inner circumferential surface of the funnel member; an outer pipe region configured to extend upward from the upper end of the tapered region and be screwed to the upper case; and an inner pipe region configured to extend upward from the inner circumferential surface of the tapered region, wherein a first through hole is formed at the lower end of the tapered region to connect between the inner space of the inner pipe region and the inner space of the funnel member, and wherein a second gas discharge groove is formed on the outer circumferential surface of the tapered region to connect between the inner space of the inner pipe region and the first gas discharge groove.

The lower case may further include a lower end pipe region configured to extend downward from the lower end of the tapered region to be inserted to the funnel member, wherein a second through hole is formed in the tapered region to connect between the inner space of the inner pipe region and the second gas discharge groove The filter part may further include a valve assembly configured to open or close the upper surface of the inner pipe region depending on the pressure of the lower space, wherein the valve assembly is configured to close the upper surface of the inner pipe region when the pressure of the lower space is less than a predetermined value, and to open upper surface of the inner pipe region when the pressure of the lower space is equal to or higher than a predetermined value.

The valve assembly may include a stopper configured to close the upper surface of the inner pipe region; a second bracket disposed in the receptive space to be restrained from up-and-down movement; and an elastic member configured to couple to the second bracket to pressurize the stopper toward the inner pipe region.

The second bracket is retrained from up-and-down movement by the filter member and the tapered region and formed in a pipe shape having a flange protruded from the upper end inner circumferential surface to support the elastic member.

The apparatus may further include a first sealing member configured to be interposed between the ion exchange membrane and the cathode to be in close contact with the ion exchange membrane and the inner circumferential surface of the connecting passage; and a second sealing member configured to be interposed between the ion exchange membrane and the anode to be in close contact with the ion exchange membrane and the inner circumferential surface of the connecting passage.

The apparatus may further include a water level sensor configured to detect a water level of the water contained in the lower space; an alarm part configured to inform information on the need for water supply due to insufficient water contained in the lower space; and a control part configured to drive the alarm part when the water level detected by the water level sensor becomes lower than a predetermined value.

The apparatus may further include a receptacle to which the container part is detachably coupled and on which a power terminal for supplying electricity to various electric devices is formed.

The container part is provided with a battery to store electricity supplied though the power terminal.

The receptacle is provided with an input part for a user to input an on/off signal of electricity supplied through the power terminal or to control power supply amount or power supply time.

According to the embodiments of this disclosure, the water receptive space is separated into an upper space and a lower space around the connecting passage provided with the ion exchange membrane, so that the hydrogen-containing water is generated in the upper space, and the oxygen and ozone are generated in the lower space and discharged to the outside through the handle part. Further, the handle part can be utilized as a water supply passage to supply water to the lower space.

According to some embodiments of this disclosure, the handle part is provided with a funnel member in which the upper outer circumferential surface is in close contact with the inner circumferential surface of the pipe member and the first gas discharge groove is formed in the upper outer circumferential surface, so that the water supply and gas discharge are smoothly performed through the handle part.

According to some embodiments of this disclosure, since the handle part is provided with the filter part to filer ozone, the gases generated in the lower space can be discharged in a state where ozone is removed.

According to some embodiments of this disclosure, the filter part is provided with a valve assembly to close the water supply passage when the pressure of the lower space is less than a predetermined value and to open the discharge passage of oxygen and ozone when the pressure of the lower space is equal to or higher than a predetermined value, so that it is possible to prevent the water from being poured through the handle part even when the apparatus for supplying hydrogen-containing water shakes or falls down and also prevent all kinds of devices including the ion exchange membrane from being damaged when oxygen and ozone generated in the lower space are accumulated to high pressure.

Other features and aspects will be apparent from the following detailed description, the drawings, and the claims.

BRIEF DESCRIPTION OF THE DRAWINGS

FIG. 6 is a perspective view illustrating an example of a disassembled handle part.

FIG. 8 is a perspective view illustrating an example of a disassembled filter part.

FIG. 9 is a perspective view illustrating a part of the filter part of FIG. 8 which is vertically cut.

FIG. 11 a perspective view illustrating a part of the valve assembly of FIG. 10 which is vertically cut.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The terms used in the description are intended to describe certain embodiments only, and shall by no means restrict the present disclosure. Unless clearly used otherwise, expressions in the singular number include a plural meaning.

In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

When one element is described as being "connected" or "coupled" to another element, it shall be construed as being connected or accessed to the other element directly but also as possibly having another element in between.

In the accompanying drawings, some elements may be exaggerated, omitted or briefly illustrated, and the dimensions of the elements do not necessarily reflect the actual dimensions of these elements.

While such terms as "first" and "second," etc., may be used to describe various components, such components must not be limited to the above terms. The above terms are used only to distinguish one component from another.

The apparatus for manufacturing hydrogen-containing water according to certain embodiments of the disclosure will be described below in more detail with reference to the accompanying drawings, in which those components are rendered the same reference number that are the same or are in correspondence, regardless of the figure number, and redundant explanations are omitted.

Figure 1:
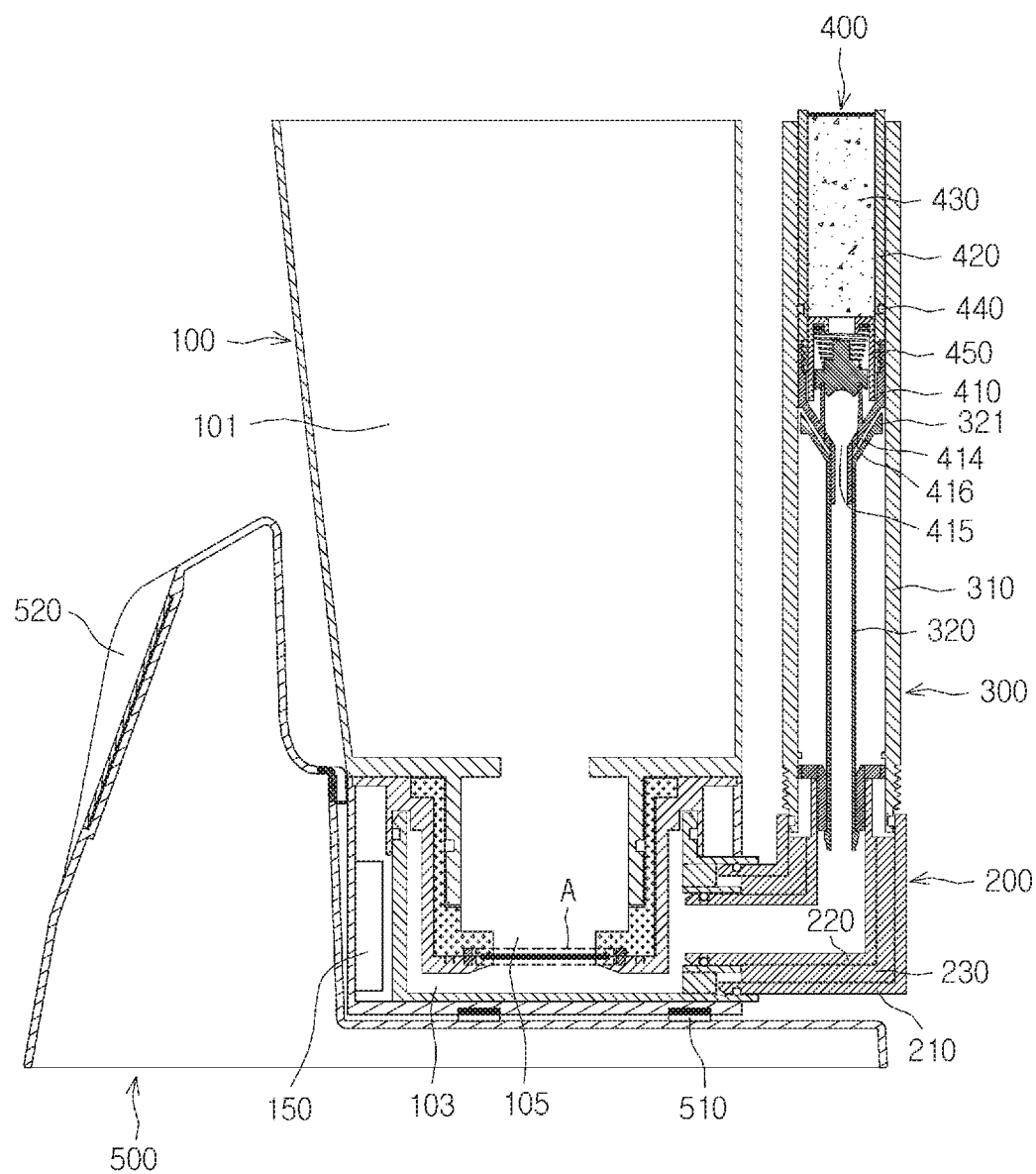
FIG. 1 is a cross-sectional view illustrating an example of an apparatus for manufacturing hydrogen-containing water.
Figure 2:
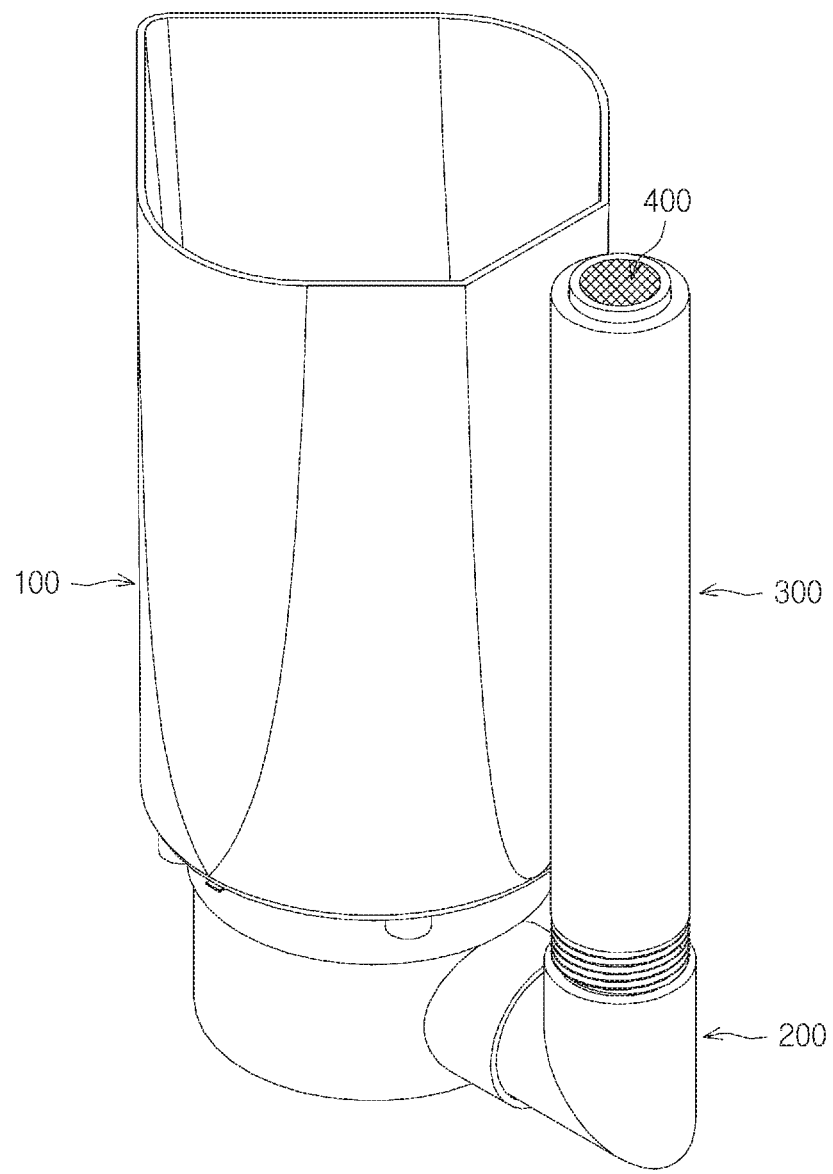
FIG. 2 is a perspective view illustrating an example of an apparatus for manufacturing hydrogen-containing water from which a receptacle is separated out.
Figure 3:
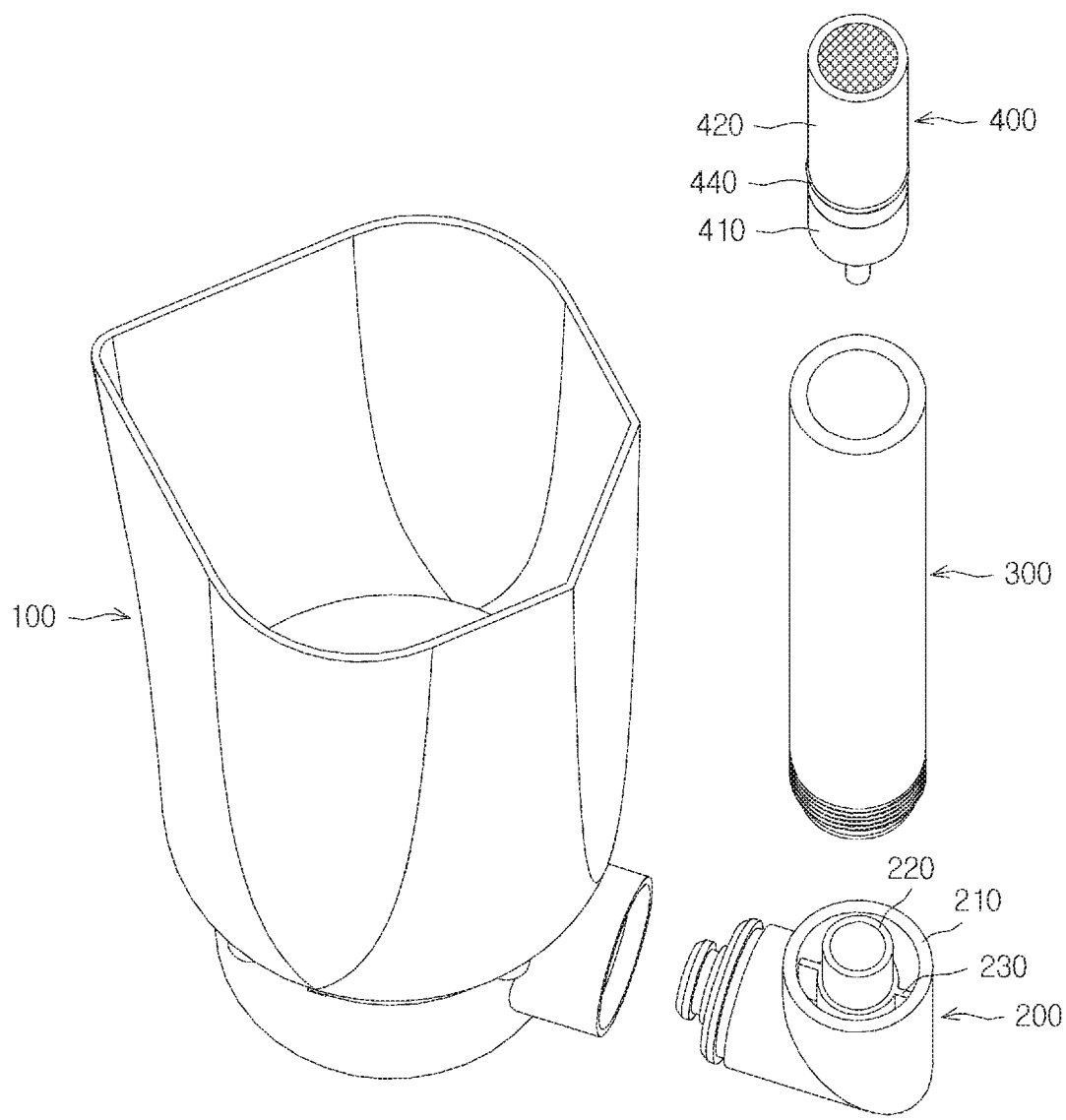
FIG. 3 is a perspective view illustrating the apparatus for manufacturing hydrogen-containing water of FIG. 2 which is partially disassembled.
Figure 4:
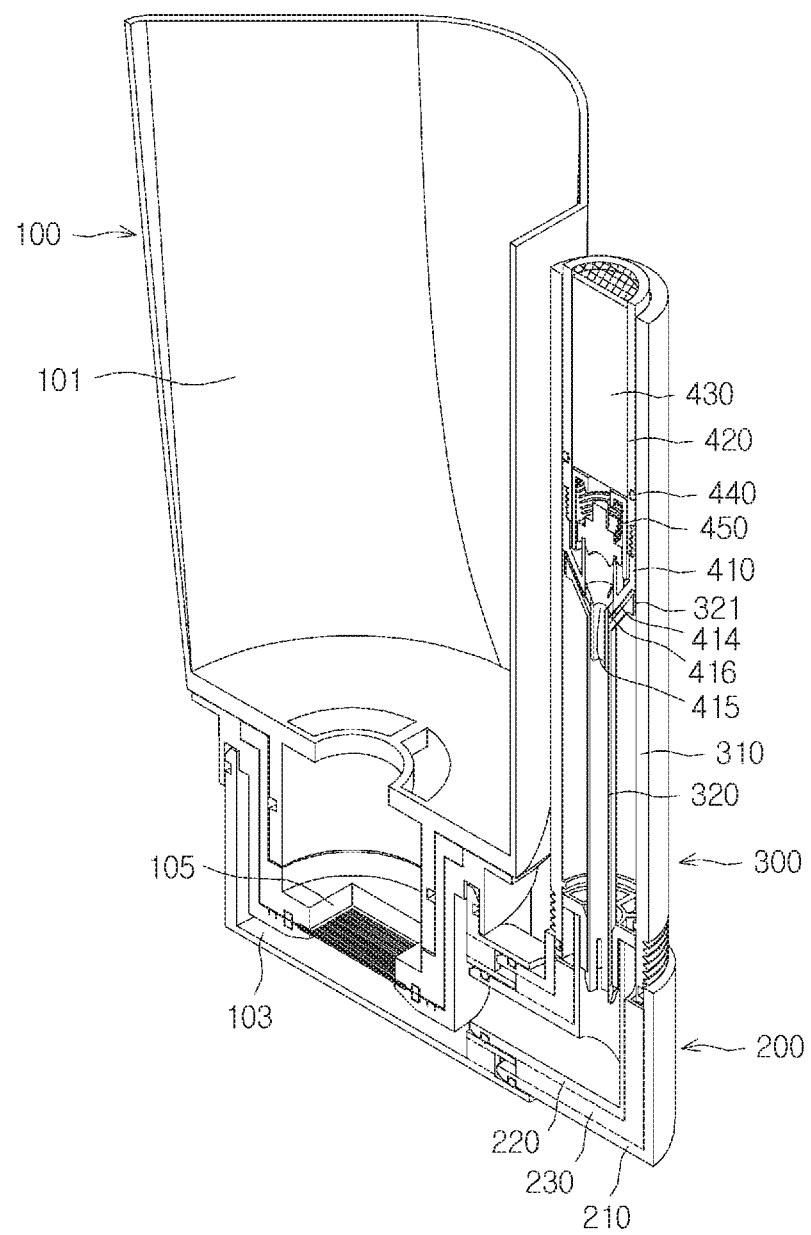
FIG. 4 a perspective view illustrating the apparatus for manufacturing hydrogen-containing water of FIG. 2 which is partially vertically cut.

FIG. 1 is a cross-sectional view illustrating an example of an apparatus for manufacturing hydrogen-containing water, FIG. 2 is a perspective view illustrating an example of an apparatus for manufacturing hydrogen-containing water from which a receptacle is separated out, FIG. 3 is a perspective view illustrating the apparatus for manufacturing hydrogen-containing water of FIG. 2 which is partially disassembled, and FIG. 4 a perspective view illustrating the apparatus for manufacturing hydrogen-containing water of FIG. 2 which is partially vertically cut.

Referring to FIG. 1 to FIG. 4, an apparatus for manufacturing hydrogen-containing water 10 according to an example includes a container part 100, a connecting part 200, a handle part 300, a filter part 400, and a receptacle 500.

An upper space 101 and a lower space 103, which receive water, may be formed in the container part 100. The upper space 101 and the lower space 103 may be disposed up and down about the connecting passage 105, respectively. The upper space 101 may be disposed on the upper side of the lower space 103 and the connecting passage 105 may be disposed between the upper space 101 and the lower space 103. That is, in the apparatus for manufacturing hydrogen-containing water 10, the upper space 101 where a cathode 121 (see FIG. 5) is installed and the lower space 103 wherein an anode 123 (see FIG. 5) is installed may be formed in one container, that is, in the container part 100.

The container part 100 may have an opened upper surface. As a result, the hydrogen-containing water generated in the upper space 101 can be discharged to the outside through the opened upper surface of the container part 100.

Figure 5:
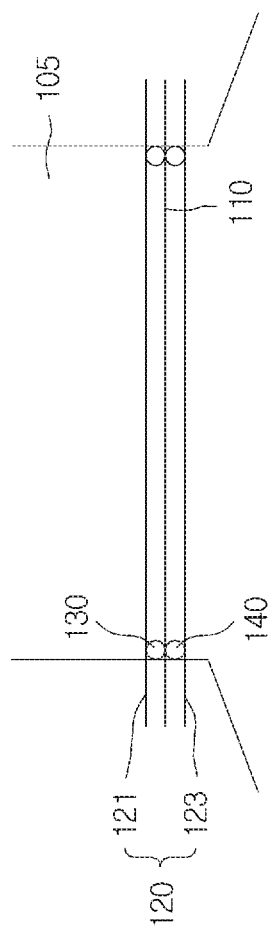
FIG. 5 is an enlarged view of a portion A in FIG. 1.

FIG. 5 is an enlarged view of a portion A in FIG. 1.

Referring to FIG. 5, an ion exchange membrane 110 and an electrolytic part 120 may be coupled to the container part 100.

The ion exchange membrane 110 does not allow water to pass, but does allow positive ions, for example, hydrogen ions ($H^+$) to pass.

The ion exchange membrane 110 may be a cation exchange membrane.

The ion exchange membrane 110 may be coupled to the container part 100 to close the connecting passage 105. The water contained in the upper space 101 cannot move to the lower space 103 and the water contained in the lower space 103 cannot move to the upper space 101.

The electrolytic part 120 can electrolyze the water contained in the container part 100.

The electrolytic part 120 may include the cathode 121 and the anode 123. The cathode 121 may be coupled to the container part 100 to be disposed on the upper space 101 and the anode 123 may be coupled to the container part 100 to be disposed on the lower space 103. This means that the cathode 121 may be disposed in the upper space 101 or disposed on the upper space 101 of the connecting passage 105 around the ion exchange membrane 110, while the anode 123 may be disposed in the lower space 103 or disposed on the lower space 103 of the connecting passage 105 around the ion exchange membrane 110.

The chemical reaction equations in the cathode 121 and the anode 123 are as follows.

Scheme 1

Anode:

$$4H_2O + 4e^- \longrightarrow 2H_2 + 4OH^-$$

Cathode:

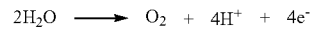
$$2H_2O \longrightarrow O_2 + 4H^+ + 4e^-$$

Referring to Scheme 1, hydrogen ($H_2$) and hydroxide ions ($OH^-$) may be generated in the upper space 101 and oxygen ($O_2$) may be generated in the lower space 103. Meanwhile, a part of oxygen ($O_2$) generated in the lower space 103 may be converted into ozone ($O_3$) by reaction with water contained in the lower space 103 as shown in the following Scheme 2.

Scheme 2

$$O_2 + H_2O \longrightarrow O_3 + 2H^+ + 2e^-$$

Referring to Schemes 1 and 2, hydrogen ions ($H^+$) may be generated in addition to oxygen ($O_2$) and ozone ($O_2$) in the lower space 103. The hydrogen ions ($H^+$) may move to the upper space 101 through the ion exchange membrane 110 and be converted into hydrogen $H_2$) in the cathode 121.

Hydrogen ($H_2$) may be dissolved in water contained in the upper space 101 to generate hydrogen-containing water because of its high solubility in water. Particularly, since hydroxide ion ($OH^-$) coexists in the upper space 101, alkalescence hydrogen-containing water may be generated. On the other hand, since oxygen ($O_2$) exists in a substantially gaseous state at room temperature, the pressure in the lower space 103 may be increased. Since ozone ($O_3$) is in an unstable state as it is, it is mostly dissolved in water or decomposed or spontaneously reduced to be converted into oxygen ($O_2$). However, since ozone ($O_3$) caused discomfort due to its distinctively pungent smell even with an extremely small amount, or has harmful effects on the human body, any appropriate treatment therefor is required.

A first sealing member 130 and a second sealing member 140 may be interposed between the cathode 121 and the anode 123 to prevent leakage.

The first sealing member 130 may be disposed between the ion exchange membrane 110 and the cathode 121 to be in close contact with the ion exchange membrane 110 and the inner circumferential surface of the connecting passage 105. The second sealing member 140 may be disposed between the exchange membrane 110 and the anode 123 to be in close contact with the ion exchange membrane 110 and the inner circumferential surface of the connecting passage 105. The first sealing member 130 and the second sealing member 140 may prevent the water contained in the upper space 101 and the water contained in the lower space 103 from leaking and mixing with each other through the joining portion between the container part 100 and the ion exchange membrane 110.

The first sealing member 130 and the second sealing member 140 may be formed of, for example, an O-ring of a silicon material.

The connecting part 200 may connect the container part 100 and the handle part 300.

The connecting part 200 may be formed in a curved shape. That is, one end of the connecting part 200 coupled to one side of the container part 100 may be horizontally extended, and the other end of the connecting part 200 coupled to the lower end of the handle part 300 may be extended upward.

The connecting part 200 may have a double pipe structure fluidly connected to the lower space 103. That is, the connecting part 200 may include an outer pipe 210 and an inner pipe 220, which are respectively fluidly connected to the lower space 103. The outer pipe 210 can be coupled to the container part 100 and the inner pipe 220 may be disposed within the outer pipe 210 to be coupled to the outer pipe 230 via a first bracket 230. Meanwhile, an outlet formed at one side of the container part 100 may be formed to have a double pipe structure to be coupled to the connection portion 200 having the double pipe structure.

The handle part 300 is coupled to the container part 100 through the connecting part 200 to simultaneously provide a supply passage for water to be supplied to the lower space 103 and a discharge passage to discharge oxygen and ozone generated from the lower space 103.

Figure 7:
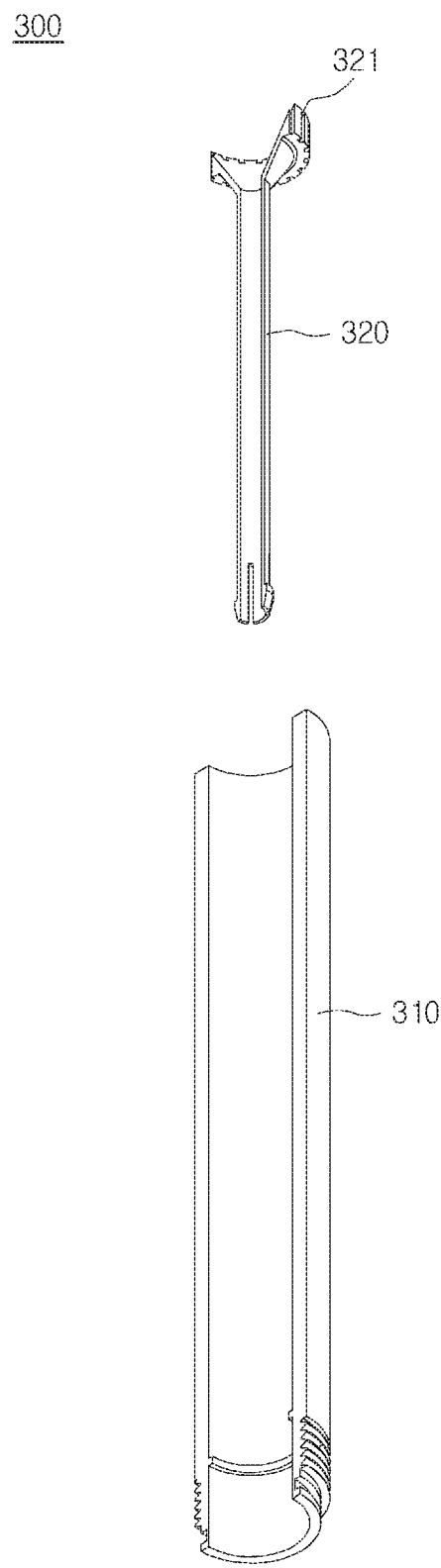
FIG. 7 is a perspective view illustrating a part of the handle part of FIG. 6 which is vertically cut.

FIG. 6 is a perspective view illustrating an example of a disassembled grip part and FIG. 7 is a perspective view illustrating a part of the grip part of FIG. 6 which is vertically cut.

Referring to FIG. 6 and FIG. 7, the handle part 300 may include a pipe member 310 and a funnel member 320.

The pipe member 310 may be coupled to the outer pipe 210 to extend upward. The pipe member 310 may be fluidly connected to the outer pipe 210.

The funnel member 320 may be coupled to the inner pipe 220 and the upper outer circumferential surface of the funnel member 320 may be in close contact with the inner circumferential surface of the pipe member 310. On the other hand, a first gas discharge groove 321 may be formed on the upper outer circumferential surface of the funnel member 320. The first gas discharge groove 321 may be vertically extended to open at both ends.

Thus, the water supplied to the funnel member 320 through the open upper surface of the pipe member 310 may be moved to the lower space 103 through the inner pipe 220, while oxygen($O_2$) and ozone($O_3$) generated in the lower space 103 and moved through the space between the outer pipe 210 and the inner pipe 220 may be moved upward through the space between the pipe member 310 and the funnel member 320 to be discharged to the outside sequentially through the first gas discharge groove and he open upper surface of the pipe member 310. The first gas discharge groove 321 may be formed in plural.

The filter part 400 may be coupled to the handle part 300 and may filter the ozone($O_3$) generated in the lower space 103.

FIG. 8 is a perspective view illustrating an example of a disassembled filter part and FIG. 9 is a perspective view illustrating a part of the filter part of FIG. 8 which is vertically cut.

Referring to FIG. 8 and FIG. 9, the filter part 400 may include a lower case 410, an upper case 420, a filter member 430, a third sealing member 440, and a valve assembly 450.

The lower case 410 may be detachably coupled to the upper case 420 and cooperate with the upper case 420 to form a receptive space to receive the filter member 430 and the valve assembly 450. The lower case 410 and the upper case 420 may be detachably coupled to each other to facilitate replacement of the filter member 430 and maintenance of the valve assembly 450.

The lower case 410 may be seated in the funnel member 320.

The lower case 410 may include a lower end pipe region 411, a tapered region 413, an outer pipe region 417, and an inner pipe region 419.

The lower end pipe region 411 may be formed in a pipe shape. The lower pipe region 411 may be inserted into the funnel member 320.

The tapered region 413 may be formed in a pipe shape that extends upward from the upper end of the lower end pipe region 411 and increases in diameter as the height increases. The tapered region 413 may be in close contact with the inner circumferential surface of the funnel member 320.

The outer pipe region 417 may extend upward from the upper end of the tapered region 413 and may be formed in a pipe shape. A female screw may be formed on the inner circumferential surface of the outer pipe region 417 so as to be screwed to the upper case 420 on which a male screw is formed on the outer circumferential surface. As another example, a male screw may be formed on the outer circumferential surface of the outer pipe region 417 and a female screw may be formed on the inner circumferential surface of the upper case 420 so as to be screwed to each other.

The inner pipe region 419 may protrude from the inner circumferential surface of the tapered region 413 to extend upward and may be formed in a pipe shape. The inner space of the inner pipe region 419 may be fluidly connected to the inner space of the lower end pipe region 411. A second gas discharge groove 414, a first through hole 415, and a second through hole 416 may be formed in the tapered region 413. The second gas discharge groove 414 may be formed in the outer circumferential surface of the tapered region 413 so that oxygen($O_2$) and ozone($O_3$) discharged through the first gas discharge groove 321 may be provided to the second through hole 416. The first through hole 415 may be formed at the lower end of the tapered region 413. The first through hole 415 may fluidly connect the inner space of the lower end pipe region 411 with the inner space of the inner pipe region 419. The second through hole 416 may be formed in the tapered region 413 to fluidly connect the inner space of the inner pipe region 419 with the second gas discharge groove 414. As a result, oxygen($O_2$) and ozone($O_3$) discharged through the first gas discharge groove 321 may be guided along the second gas discharge groove 414 and then pass through the second through hole 416 to reach the inner space of the inner pipe region 419. Meanwhile, the second gas discharge groove 414 and the second through hole 416 may be formed in plural.

The upper case 420 may be formed in a vertically opened pipe shape.

A network-structure mesh net 421 may be coupled to the open upper surface of the upper case 420.

The filter member 430 may be disposed above the receptive space formed by the lower case 410 and the upper case 420.

The filter member 430 may filter the ozone($O_3$) and allow the oxygen($O_2$) to pass among the oxygen($O_2$) and the ozone($O_3$) discharged from the lower space 103. The oxygen ($O_2$) passed through the filter member 430 may be discharged to the outside through the mesh net 421.

The third sealing member 440 may be coupled to the outer circumferential surface of the lower case 410 or the upper case 420. The third sealing member 440 may prevent the oxygen($O_2$) and the ozone($O_3$) discharged from the lower space 103 from discharging through the gap between the pipe member 310 and the filter part 400 without passing through the filter part 400.

The third sealing member 440 may be made of, for example, an O-ring of a silicon material.

The valve assembly 450 may be disposed below the receptive space formed by the lower case 410 and the upper case 420.

The valve assembly 450 may open or close the opened upper surface of the inner pipe region 419 in accordance with the pressure in the lower space 103. Specifically, the valve assembly 450 may close the opened upper surface of the inner pipe region 419 when the pressure in the lower space 103 is less than a predetermined value, while it may open the opened upper surface of the inner pipe region 419 when the pressure in the lower space 103 is equal to or higher than a predetermined value The opened upper surface of the inner pipe region 419 can be opened. As a result, the valve assembly 450 can prevent the water contained in the lower space 103 from being poured through the handle part 300 even when the apparatus for supplying hydrogen-containing water 10 shakes or falls down and also prevent all kinds of devices including the ion exchange membrane 110, which are installed in or in contact with the lower space 103, from being damaged when the oxygen($O_2$) and the ozone ($O_3$) generated in the lower space are accumulated to high pressure. The pressure of the lower space 103, which is a reference for opening/closing the opened upper surface of the inner pipe region 419 by the valve assembly 450, may be determined based on physical properties of various devices disposed in or contacted with the lower space 103, for example breaking strength of the ion exchange membrane 110 and the like FIG. 10 is a perspective view illustrating an example of a disassembled valve assembly and FIG. 11 a perspective view illustrating a part of the valve assembly of FIG. 10 which is vertically cut.

Figure 10:
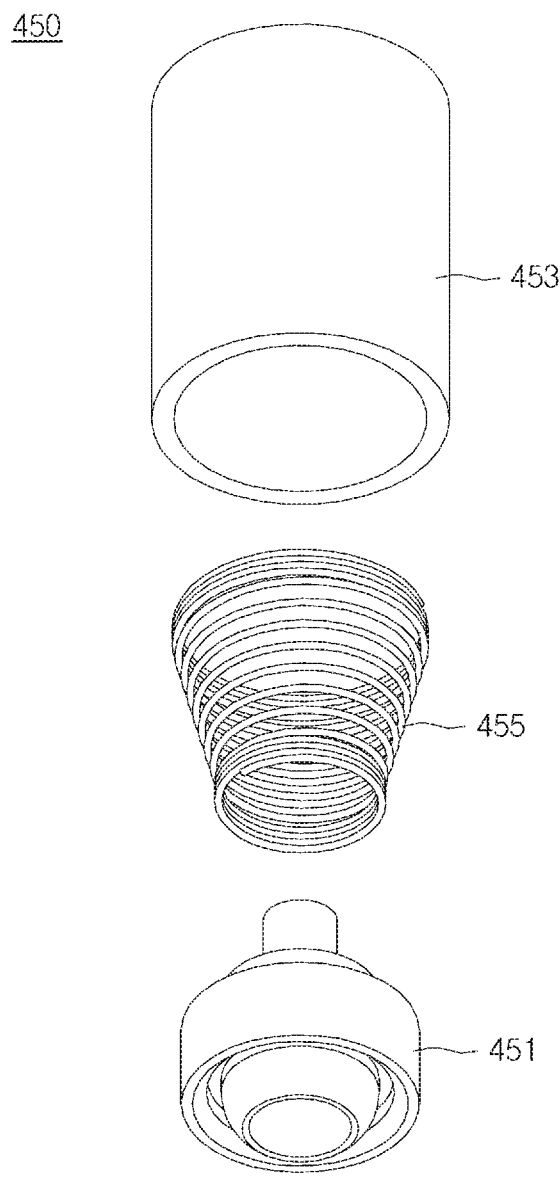
FIG. 10 is a perspective view illustrating an example of a disassembled valve assembly.

Referring to FIG. 10 and FIG. 11, the valve assembly 450 may include a stopper 451, a second bracket 453, and an elastic member 455.

The stopper 451 may be disposed on the upper side of the inner pipe region 419.

The stopper 451 may be shaped to close the opened upper surface of the inner pipe region 419.

The second bracket 453 may be disposed in the receptive space formed by the lower case 410 and the upper case 420 to be restrained from up-and-down movement. The second bracket 453 needs to be restrained from up-and-down movement to support the elastic member 455 to pressure the stopper 451 toward the inner pipe region 419.

The second bracket 453 may be fixed to the inner circumferential surface of the lower case 410 or the upper case 420, but may be in close contact with the filter member 430 and the inner circumferential surface of the tapered area 413 to be restrained from up-and-down movement, instead of being fixed to the lower case 410 and the upper case 420 as shown. In the latter case, replacement of the filter member 430 and maintenance of the valve assembly 450 may be relatively easy.

The second bracket 453 may be formed in a pipe shape having a flange protruded from the upper end inner circumferential surface to support the elastic member 455.

The elastic member 455 may be engaged with the second bracket 453 and pressure the stopper 451 toward to the inner pipe region 419. The physical properties of the elastic member 455 such as the elastic modulus may be determined according to the pressure of the lower space 103, which is a reference for opening/closing the opened upper surface of the inner pipe region 419.

The container part 100 may be mounted on the receptacle 500. Particularly, the receptacle 500 may have a structure on which the container part 100 can be detachably coupled, thereby enhancing user convenience. For example, a user can lift the container part 100 separated from the receptacle 500 and directly drink or pour into the cup to drink the hydrogen-containing water.

A power terminal 510 for supplying electricity to various electric devices, for example, the electrolytic part 120, mounted on the container part 100 may be formed on the receptacle 500. The electricity supplied through the power terminal 510 may be stored in the battery 150 mounted on the container part 100. As a result, since hydrogen-containing water can be generated even when the container part 100 is disconnected from the receptacle 500 to be connected to an external power source in order to supply electricity to the power terminal 510, mobility and portability of the apparatus for manufacturing hydrogen-containing water 10 can be improved.

The receptacle 500 may be provided with an input unit 520. A user may use the input part 520 to input an on-off signal of electric power to be supplied to various electric devices or the battery 150 mounted on the container part 100 through the power terminal 510 or to control power supply amount or power supply time. The user can adjust the hydrogen concentration by adjusting the power supply amount through the input unit 520 and adjust the hydrogen supply water production time by adjusting the power supply time through the input unit 520.

Figure 12:
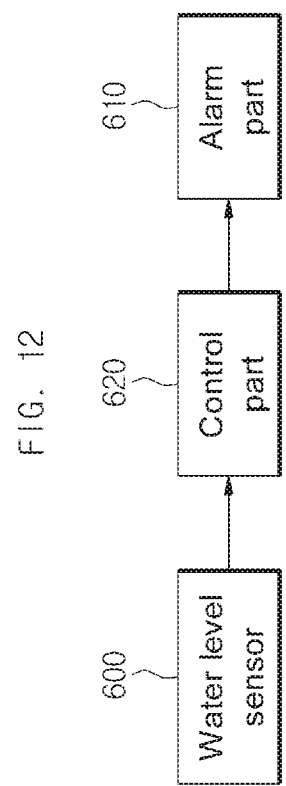
FIG. 12 is a diagram illustrating an example of a control part.

FIG. 12 is a diagram illustrating an example of a control part.

Referring to FIG. 12, an apparatus for manufacturing hydrogen-containing water 10 according to an example may further include a water level sensor 600, an alarm part 610, and a control part 620.

The water level sensor 600 may detect the level of water contained in the lower space 103. The water level sensor 600 may be installed in the container part 100.

The alarm part 610 may inform information on the need for water supply due to insufficient water contained in the lower space 103 to the outside. The alarm part 610 may be installed in the container part 100 or the receptacle 500. The alarm part 610 may include various information display devices, for example, LED lights, sirens, display devices, and the like.

The control part 620 may drive the alarm part 610 to inform information on the need for water supply due to insufficient water contained in the lower space 103 to the outside when the water level detected by the water level sensor 600 is lower than a predetermined value. Through this, the user can determine the timing of water supply. The water level, which is a reference of the control part 620 for driving the alarm part 610, may be set to a minimum water level necessary for producing hydrogen-containing water, for example, a water level above which the anode 123 can be immersed.

Figure 13:
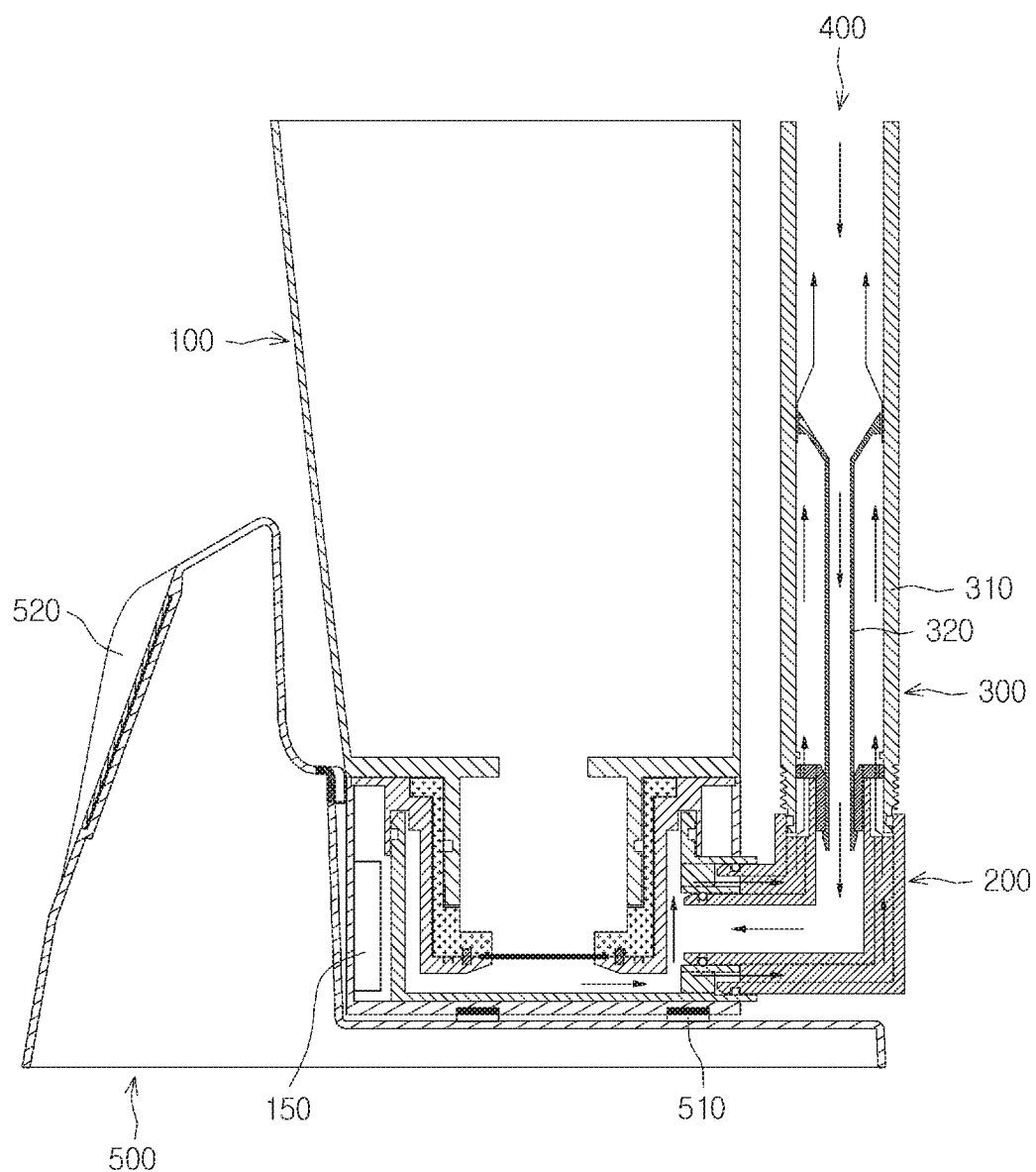
FIG. 13 a cross-sectional view illustrating an example of an apparatus for manufacturing hydrogen-containing water in which water is being supplied.

FIG. 13 a cross-sectional view illustrating an example of an apparatus for manufacturing hydrogen-containing water in which water is being supplied.

Referring to FIG. 13, a user may supply water through the opened upper surface of the pipe member 310 after separating the filter part 400 from the handle part 300.

The water supplied through the opened upper surface of the pipe member 310 may flow into the lower space 103 sequentially through the inner space of the funnel member 320 and the inner pipe 220. At this time, the gas filling a part of the lower space 103 may be discharged to the outside sequentially passing through the space between the outer pipe 210 and the inner pipe 220, the space between the pipe member 310 and the funnel member 320, and the first gas discharge groove 321 and finally through the opened upper surface of the pipe member 310.

When the water supply is completed, The filter part 400 may be coupled to the handle part 300 as shown in FIG. 1. Oxygen($O_2$) and ozone($O_3$) may be continuously generated in the lower space 103 when the hydrogen-containing water production time elapses in the state where the filter part 400 is coupled to the handle part 300. However, since the upper surface of the inner pipe region 419 is closed by the stopper 451, oxygen($O_2$) and ozone($O_3$) are accumulated in the lower space 103, thereby increasing the pressure in the lower space 103.

Figure 14:
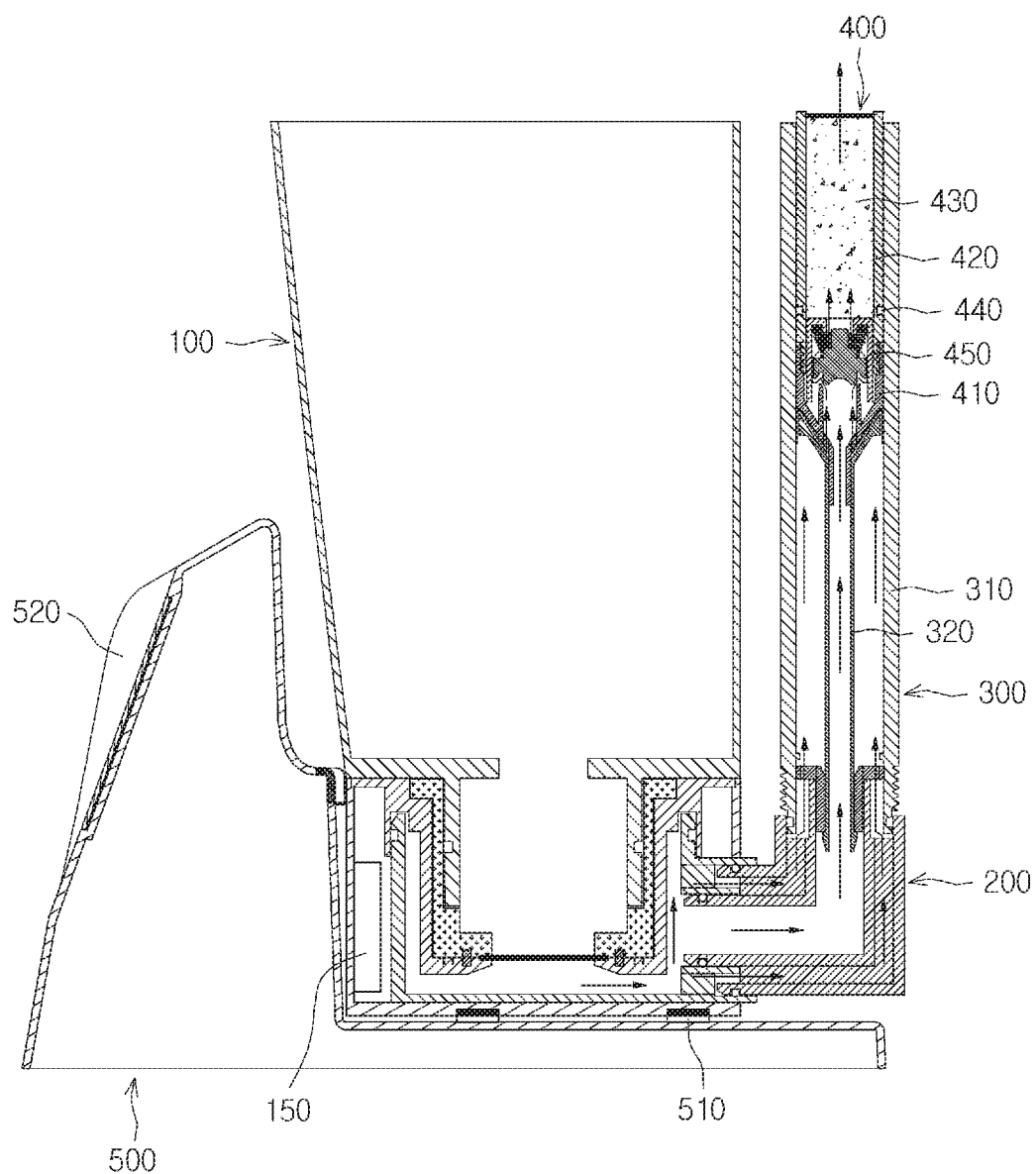
FIG. 14 is a cross-cross-sectional view illustrating an example of an apparatus for manufacturing hydrogen-containing water which is manufacturing hydrogen-containing water.

FIG. 14 is a cross-cross-sectional view illustrating an example of an apparatus for manufacturing hydrogen-containing water which is manufacturing hydrogen-containing water.

Referring to FIG. 14, when the pressure of the lower space 103 becomes equal to or greater than a predetermined value, the stopper 451 that closes the upper surface of the inner pipe region 419 is raised while compressing the elastic member 455, so that the upper surface of the inner pipe region 419 may be opened. As a result, oxygen($O_2$) and ozone($O_3$) accumulated in the lower space 103 or newly generated in the lower space 103 may flow into the filter member 430 sequentially passing through the space between the outer pipe 210 and the inner pipe 220, the space between the pipe member 310 and the funnel member 320, the first gas discharge groove 321, the second gas discharge groove 414, the second through hole 416, and the inner pipe region 419.

Oxygen($O_2$) may be discharged to the outside by passing through the filter member 430 across the mesh net 421, but ozone($O_3$) may be filtered by the filter member 430. Meanwhile, oxygen($O_2$) and ozone($O_3$) accumulated in the lower space 103 or newly generated in the lower space 103 may flow into the filter member 430 through a different path of the inner pipe 220, the inner space of the funnel member 320, the first through hole 415 and the inner pipe region 419 in order.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for manufacturing hydrogen-containing water, the apparatus comprising:
   a container comprising an upper space and a lower space, the upper space and the lower space being interconnected by a connecting passage and positioned vertically around the connecting passage;
   an ion exchange membrane configured to close the connecting passage;
   a cathode disposed on the upper space;
   an anode disposed on the lower space;
   a handle coupled to the container and configured to provide a supply passage for water to be supplied to the lower space and a discharge passage to discharge oxygen and ozone generated from the lower space; and
   a connector having a double pipe structure and connecting the container and the handle,
   wherein the handle comprises:
      a handle pipe coupled to an outer pipe of the connector and extending upward; and
      a funnel coupled to an inner pipe of the connector and having an upper outer circumferential surface in contact with an inner circumferential surface of the handle pipe, and
   wherein a first gas discharge groove is formed on the upper outer circumferential surface of the funnel.

2. The apparatus of claim 1, further comprising a filter cartridge coupled to the handle and configured to filter the ozone discharged from the lower space.

3. The apparatus of claim 2, wherein the filter cartridge comprises:
   a lower case configured to seat to the funnel;
   an upper case detachably coupled to the lower case and configured to cooperate with the lower case to form a receptive space;
   a mesh net configured to close an opened upper surface of the upper case;
   an ozone filter disposed in the receptive space to filter ozone; and
   a third seal coupled to an outer circumferential surface of the lower case or the upper case, and
   wherein the lower case is formed such that the receptive space is connected to an inner space of the funnel and the first gas discharge groove.

4. The apparatus of claim 3, wherein the lower case comprises:
   a tapered region configured to be in contact with the inner circumferential surface of the funnel;
   an outer pipe region extending upward from an upper end of the tapered region and screwed to the upper case; and
   an inner pipe region extending upward from an inner circumferential surface of the tapered region,
   wherein a first through hole is formed at a lower end of the tapered region to connect between an inner space of the inner pipe region and the inner space of the funnel, and
   wherein a second gas discharge groove is formed on an outer circumferential surface of the tapered region to connect between the inner space of the inner pipe region and the first gas discharge groove.

5. The apparatus of claim 4, wherein the lower case further comprises a lower end pipe region configured to extend downward from the lower end of the tapered region and to be inserted into the funnel,
   wherein a second through hole is formed in the tapered region to connect between the inner space of the inner pipe region and the second gas discharge groove.

6. The apparatus of claim 4, wherein the filter cartridge further comprises a valve configured to open or close an upper surface of the inner pipe region depending on a pressure of the lower space, and wherein the valve is configured to close the upper surface of the inner pipe region when the pressure of the lower space is less than a predetermined value, and to open the upper surface of the inner pipe region when the pressure of the lower space is equal to or higher than the predetermined value.

7. The apparatus of claim 6, wherein the valve comprises:
a stopper configured to close the upper surface of the inner pipe region;
a second bracket disposed in the receptive space and configured to be restrained from up-and-down movement; and
an elastic member coupled to the second bracket to pressurize the stopper toward the inner pipe region.

8. The apparatus of claim 7, wherein the second bracket is restrained from up-and-down movement by the ozone filter and the tapered region, and wherein the second bracket is formed in a pipe shape having a flange protruded from an upper end inner circumferential surface to support the elastic member.

9. The apparatus of claim 1, further comprising:
a first seal interposed between the ion exchange membrane and the cathode so as to be in contact with the ion exchange membrane and an inner circumferential surface of the connecting passage; and
a second seal interposed between the ion exchange membrane and the anode so as to be in contact with the ion exchange membrane and the inner circumferential surface of the connecting passage.

10. The apparatus of claim 1, further comprising:
a water level sensor configured to detect a water level of the water contained in the lower space;
an alarm configured to inform information on the need for water supply due to insufficient water contained in the lower space; and
a controller configured to drive the alarm when the water level detected by the water level sensor becomes lower than a predetermined value.

11. The apparatus of claim 1, further comprising a receptable to which the container is detachably coupled and on which a power terminal configured to supply electricity to various electric devices is formed.

12. The apparatus of claim 11, wherein the container comprises a battery to store electricity supplied though the power terminal.

* * * * *